United States Patent
Barrett

(10) Patent No.: US 7,426,310 B1
(45) Date of Patent: Sep. 16, 2008

(54) METHOD AND APPLICATION OF APPLYING FILTERS TO N-DIMENSIONAL SIGNALS AND IMAGES IN SIGNAL PROJECTION SPACE

(76) Inventor: Terence W. Barrett, 1453 Beulah Rd., Vienna, VA (US) 22182

( * ) Notice: Subject to any disclaimer, the term of this patent is extended or adjusted under 35 U.S.C. 154(b) by 589 days.

(21) Appl. No.: 10/353,078

(22) Filed: Jan. 29, 2003

Related U.S. Application Data

(60) Provisional application No. 60/354,489, filed on Feb. 8, 2002.

(51) Int. Cl.
*G06K 9/36* (2006.01)
*G06K 9/46* (2006.01)
*G06K 9/40* (2006.01)
(52) U.S. Cl. .................. 382/248; 382/260; 382/232
(58) Field of Classification Search ............. 382/232, 382/248, 260–265
See application file for complete search history.

(56) References Cited

U.S. PATENT DOCUMENTS

| | | | | |
|---|---|---|---|---|
| 6,526,175 | B2 * | 2/2003 | Sodagar et al. | 382/240 |
| 6,768,518 | B1 * | 7/2004 | Bozdagi | 348/615 |
| 6,873,721 | B1 * | 3/2005 | Beyerer et al. | 382/152 |
| 6,898,583 | B1 * | 5/2005 | Rising, III | 706/22 |

OTHER PUBLICATIONS

Kak, A.C. & Slaney, M., *Principles of Computerized Tomographic Imaging*, Society for Industrial and Applied Mathematics, Philadelphia, 2001.
Mallat, S., *A Wavelet Tour of Signal Processing*, 2nd Edition, Academic Press, New York, 1999.
Meyer, Y., *Wavelets: Algorithms & Applications*, Society for Industrial & Applied Mathematics, Philadelphia, 1993.

* cited by examiner

*Primary Examiner*—Matthew C. Bella
*Assistant Examiner*—Wesley Tucker
(74) *Attorney, Agent, or Firm*—Bacon & Thomas, PLLC

(57) ABSTRACT

A Radon transform of the image(s) or array(s); and convolution of the Fourier transform of any 1D filter or mask, e.g., wavelet filters, with a 1D Ram-Lak, or other band-limited filter; convolution of the resultant 1D filters with each of the 1D columns of the 2D Radon transform or projection space version of the image; and an inverse Radon transform of the now omnidirectionally filtered projection space version of the image either directly, or after transmission.

16 Claims, 5 Drawing Sheets

Radon transform: parallel projections for two angles. f(x,y) represents an image.

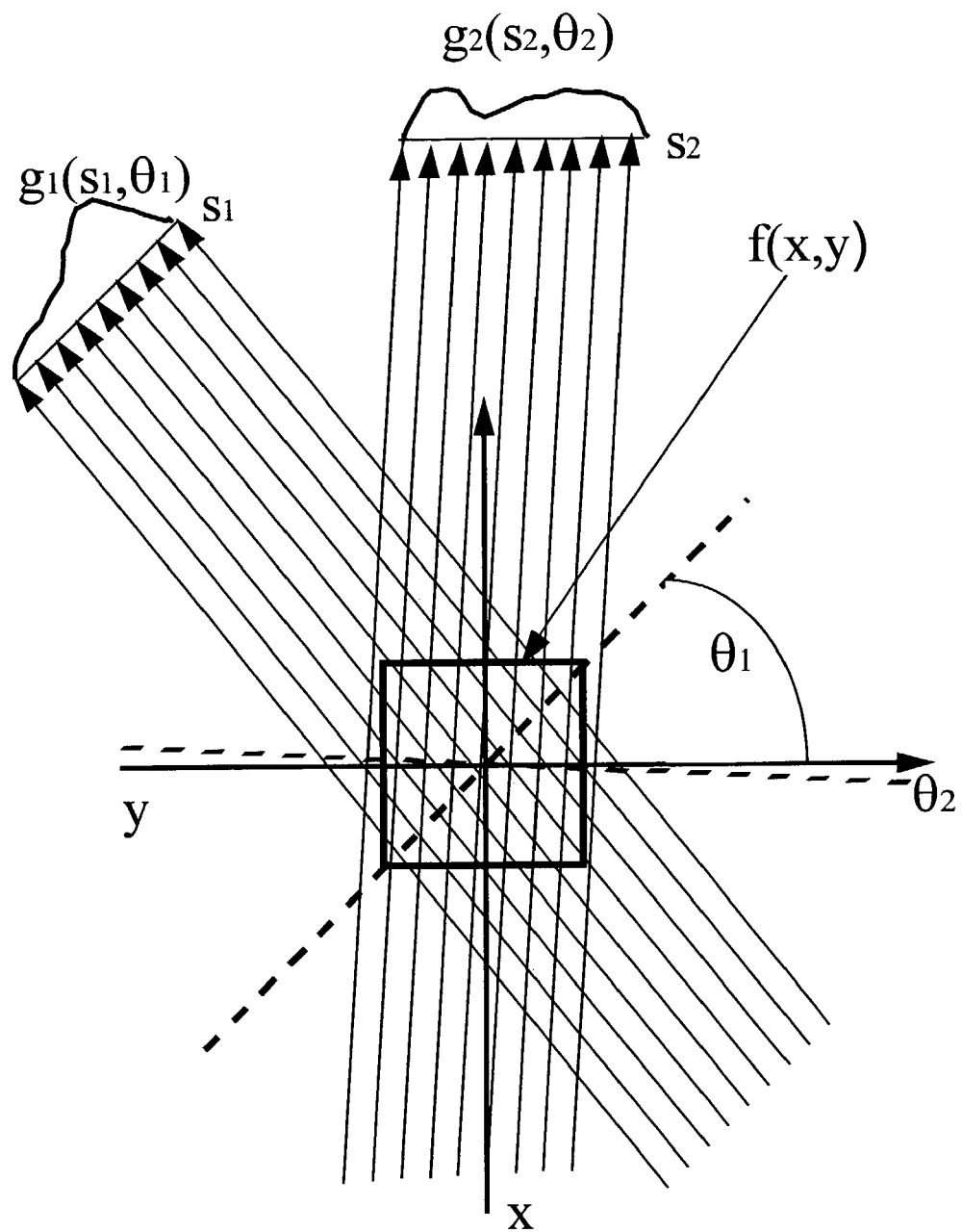
Fig 1 Radon transform: parallel projections for two angles. f(x,y) represents an image.

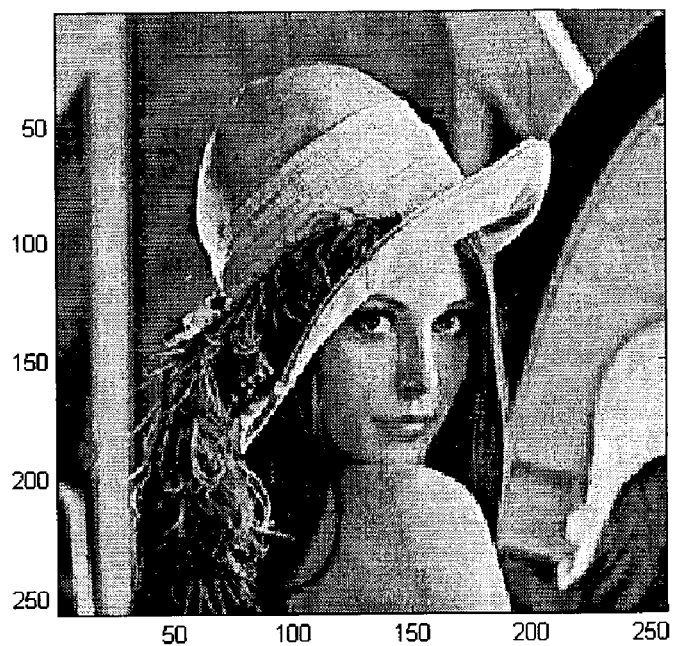
Fig 2 Representative image: the standard image Lena.
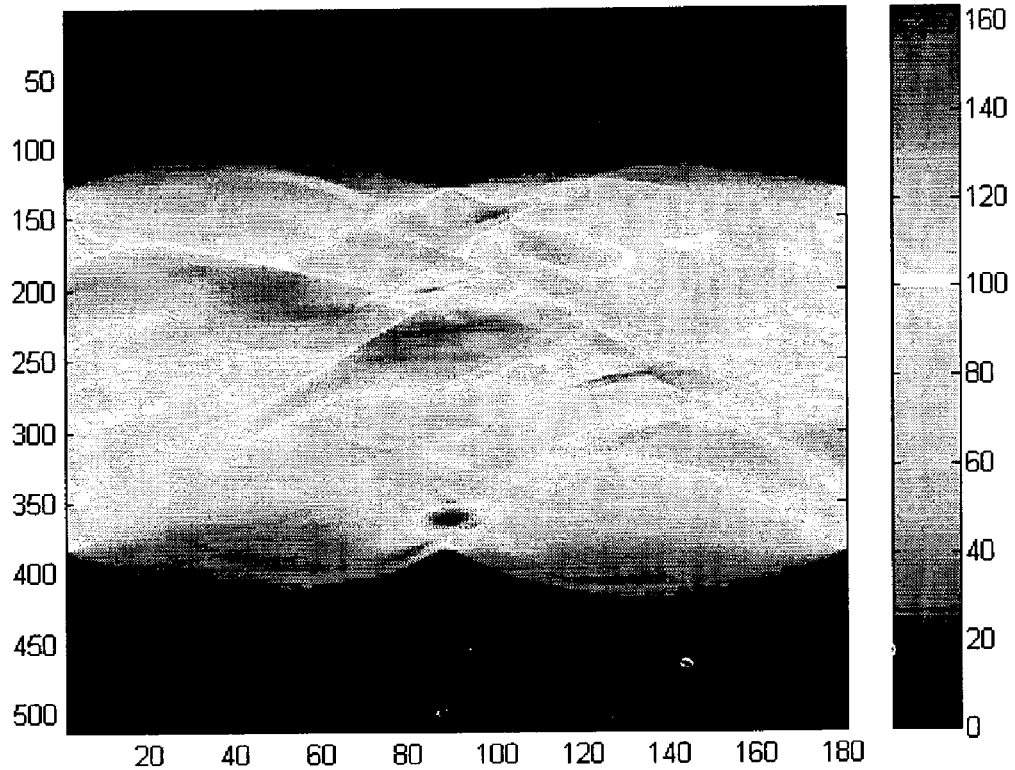
Fig 3 The Radon transform of the Lena image.

Fig 4 The inverse radon transform of Lena using only Ram-Lak filtering.
Fig 5A The inverse Radon Transform using a filter, Weber0 - q = 4; j = 10, convolved with the Ram-Lak filter.

Fig 5B The inverse Radon Transform using a filter, Weber0, mult = 100, q = 4, and j = 6, convolved with the Ram-Lak filter.
Fig 5C The inverse Radon Transform using a filter, Weber0 mult 4x10^29 q =16, j = 2, convolved with the Ram-Lak filter.

Fig 5D The inverse Radon Transform using a filter, Weber0 mult 1., q = 2, j = 8, convolved with the Ram-Lak filter.
Fig 5E The inverse radon Transform using a filter, Weber1 mult 10 q = 4, j = 1, convolved with the Ram-Lak filter.

METHOD AND APPLICATION OF APPLYING FILTERS TO N-DIMENSIONAL SIGNALS AND IMAGES IN SIGNAL PROJECTION SPACE

RELATED APPLICATION DATA

This application claims the benefit of U.S. Provisional Application No. 60/354,489, filed Feb. 8, 2002, which is hereby incorporated by reference.

The invention was made with Government support under Contract No N00178-00-C-3058 awarded by Missile Defense Agency and monitored by the Naval Surface Warfare Center, Dahlgren, Va. The Government has certain rights in the invention.

BACKGROUND OF THE INVENTION

The present invention relates generally to the filtering, e.g., wavelet filtering, of n-dimensional signals, images or arrays (hereinafter: signals), for the purposes of signal decomposition, enhancement, compression, restoration, denoising, segmentation, feature extraction and target/object/surface detection/recognition. The analysis method of the invention provides a complete omnidirectional (0-180 degrees) but yet one-dimensional (1D) filtering method for two-dimensional (2D) images that is superior to the methods of prior art. The methods of prior art either bias the filtering process in the horizontal, vertical and diagonal directions of the image, or depart from filter definitions in adopting a circular form.

The methods described here permit the construction of microprocessors that allow certain operations to be done in hardware. Those operations are (1) a Radon transform of the image(s) or array(s)—we shall refer to the transformed image as the projection space version of the image; and (2) convolution of the Fourier transform of the 1D filters, e.g., wavelet filters, with a 1D Ram-Lak, or other bandlimited filter—the resultant of the convolutions we refer to as the resultant 1D filters; (3) convolution of the resultant 1D filters with each of the 1D columns of the 2D Radon transform or projection space version of the image; and (4) an inverse Radon transform of the now omnidirectionally filtered projection space version of the image, either directly or after transmission.

OBJECT OF THE INVENTION

Prior art in signal/image representation methods do not provide algorithms that filter omnidirectionally, i.e., unbiased in any direction. For example:

The prior art two-dimensional generalization of quadrature mirror (wavelet) filters addressing the analysis of trends (averages) and fluctuations (differences) decomposes an image by computing (1) trends along rows followed by trends along columns; (2) trends along rows followed by fluctuations along columns, (3) fluctuations along rows followed by trends along columns; and (4) fluctuations along both rows and columns. In a pyramidal filtering scheme, 4 arrays of coefficients (of decreasing size) are produced at each level and the filtering is performed only in the vertical and horizontal directions. It is an object of the present invention to provide methods to analyze trends and fluctuations omnidirectionally (0-180 degrees) by applying 1D filters to the 2D projection space representation of the image, i.e., the image's Radon transform. Thus in this projection form the image is in a 2D omnidirectional representational form and can be filtered through 0-180 degrees, yet with 1D filters, and using one procedure.

The prior art generalization of a 1D filter to 2D form provides no detection capability for image features that lie at specific angles. It is an object of the present invention to provide methods for detecting image features that exist only at specific angles.

In the case of 2D wavelet compression of 2D images by the methods of prior art, significant coefficients resulting from a pyramidal analysis are transmitted, together with a significance map. If an omnidirectional representation is required using prior art, the same procedure must be applied n times to compress the same 2D images at all n angles. It is an object of the present invention to provide methods for compressing 2D images oriented omnidirectionally (0-180 degrees) with 1D filters, e.g., wavelets, but in one procedure. The resulting coefficients are transmitted with a significance map.

In the case of 2D wavelet image enhancement of 2D images by the methods of prior art, a 2D, but oriented wavelet is used to process an image. To provide omnidirectional (0-180 degrees) processing of an image, the orientation of the wavelet is progressively changed, and the image is processed by the same methods at all the orientations adopted by the wavelet. Thus to process an image at n angles requires n processing sequences. It is an object of the present invention to provide methods for enhancing 2D images in any orientation (0-180 degrees) by using 1D filtering of the rows of the Radon transformed image and then the inverse Radon transforming of the resultant of that filtering, all in one processing sequence.

Therefore, it is an object of the present invention to provide methods to analyze trends and fluctuations omnidirectionally by applying 1D filters to the 2D projection space representation of the image, or the image's Radon transform. Thus in this projection form the image is in an omnidirectional representational form and can be filtered through 0-180 degrees in one procedure.

It is a further object of the present invention to provide methods for detecting image features that exist only at specific angles.

It is a further object of the present invention to provide methods for compressing 2D images oriented omnidirectionally (at all angles) with 1D wavelets, the resulting coefficients being transmitted with a significance map.

It is a further object of the present invention to provide for enhancing 2D images in any orientation by using 1D filtering of the rows of the Radon transformed image and the inverse Radon transforming of the resultant of that filtering, all in one processing sequence.

SUMMARY OF THE INVENTION

Briefly, the above and all other objects of the invention are achieved in a Radon transform of the image(s) or array(s); and convolution of the Fourier transform of any 1D filter or mask, e.g., wavelet filters, with a 1D Ram-Lak, or other band-limited filter; convolution of the resultant 1D filters with each of the 1D columns of the 2D Radon transform or projection space version of the image; and an inverse Radon transform of the now omnidirectionally filtered projection space version of the image either directly, or after transmission.

Means are described for instantiating said methods in either software, or hardware and software, or dedicated hardware.

BRIEF DESCRIPTION OF THE DRAWINGS

FIG. 1—Radon transform: parallel projections for two angles. f(x,y) represents and image.

FIG. 2—Representative image: the standard image Lena.

FIG. 3—The Radon transform of the Lena image.

FIG. 4—The inverse radon transform of Lena using only Ram-Lak filtering.

FIG. 5A—The inverse Radon Transform using a filter, Weber0–q=4; j=10, convolved with the Ram-Lak filter.

FIG. 5B—The inverse Radon Transform using a filter, Weber0, mult=100, q=4, and j=6, convolved with the Ram-Lak filter.

FIG. 5C—The inverse Radon Transform using a filter, Weber0 mult 4×10^129 q=16, j=2, convolved with the Ram-Lak filter.

FIG. 5D—The inverse Radon Transform using a filter, Weber0 mult 1, q=2, j=8, convolved with the Ram-Lak filter.

FIG. 5E—The inverse radon Transform using a filter, Weber1 mult 10 q=4, j=1, convolved with the Ram-Lak filter.

DETAILED DESCRIPTION OF THE INVENTION

The omnidirectional (0-180 degrees) Radon transform of an (x,y) image is the collection of line integrals, g(s,θ), along lines inclined at angles θ from the y-axis and at a distance s from the origin. The line integrals are space-limited in s and are periodic in θ with period $2\pi$ (FIG. 1).

The inverse Radon transform is obtained by means of a back-projection operator. The back-projection operator at (r,φ) is the integration of the line integrals g(s,θ) along the sinusoid s=r cos(θ–φ) in the (s,θ) plane. Thus the back-projection operator maps a function of (s,θ) coordinates into a function of spatial coordinates (x,y) or (r,φ) and integrates into every image pixel over all angles θ. The resulting image is blurred by the point spread function. The back-projection is the adjoint of the inverse Radon transform, which can be obtained by a filtering operation, that has a variety of approximations, e.g.: Ram-Lak, Shepp-Logan, etc., Ram-Lak being the most common. This filtering operation required to capture the inverse Radon transform from the back-projection can be implemented using the Fast Fourier transform (FFT).

The Radon transform and its inverse is well-known to prior art (cf. Kak & Slaney, 2001). The application of 2D wavelet filters for image filtering, enhancement, compression, etc. is also well-known to prior art (cf. Meyer, 1993, Mallat, 1999). The present invention combines the Radon transform with 1D wavelet or other filters or masks, in a novel way, namely:

By performing (1) a Radon transform of the image(s) or array(s) by any method known to those familiar with the art; (2) convolution of the Fourier transform of the 1D filters, e.g., wavelet filters, or masks with a 1D Ram-Lak, or other band-limited filter; (3) convolution of the resultant 1D filters with each of the 1D columns of the 2D Radon transform or projection space version of the image by any method known to those familiar in the art; and (4) an inverse Radon transform of the now omnidirectionally filtered projection space version of the image, either directly or after transmission.

These methods of operation are illustrated in the following figures. FIG. 2 is a representative standard Lena image. FIG. 3 is the Radon transform of the Lena image. FIG. 4 is the inverse Radon transform of the original image using only Ram-Lak filtering. FIGS. 5A-D are the resultant images obtained by filtering the Lena image in the projection plane using both a de-blurring filter and an image enhancing filter in the back-projection operation.

PREFERRED EMBODIMENT OF THE INVENTION

The invention can be instantiated in a variety of ways to those familiar in the art of expressing processing algorithms—both in software and hardware or a combination of hardware and software. The hardware can either be general purpose computers, special purpose computers, adjunct dedicated hardware, accelerators, or processing module chip sets. The embodiment can employ the Fast Fourier transform (FFT) or other methods known to those familiar with the processing art.

APPLICATIONS

The methods and apparatus have applications in omnidirectional (0-180 degrees) image decomposition, enhancement, compression, restoration, denoising, segmentation, feature extraction and target/object/surface detection/recognition. Application areas include security operations, robot vision, biomedical image processing and target detection.

What is claimed is:

1. A method of multiple angle (e.g. 0-180 degrees, 181-360 degrees) analyzing trends and fluctuations of an image comprising the steps of:
    performing a Radon transform of the image to obtain a 2D projection space version of the image;
    performing a convolution of a Fourier transform of at least one 1D filter to obtain at least one resultant 1D filter;
    performing a convolution of the at least one resultant 1D filter with at least one 1D column of the 2D Radon transform of the image to obtain a filtered projection space version of the image;
    performing an inverse Radon transform of the projection space version of the image to obtain a filtered version of the image; and
    outputting the filtered version of the image to a utilization device.

2. A method of detecting image features at specific angles in the image comprising:
    (1) performing a Radon transform of the image to projection space to obtain a 2D projection space version image;
    (2) applying one-dimensional filters to the 2D projection space version of the image at selected angles to produce a filtered image;
    (3) inverse transforming the filtered image back to the original space; and
    (4) outputting the results thereof to a utilization device that detects said image features.

3. A method of enhancing a two-dimensional image across a selected set of angles comprising:
    (1) performing a Radon transform of the image to projection space to obtain a 2D projection space version of the image;
    (2) applying one-dimensional filters to the 2D projection space version of the image at a set of selected angles to produce a filtered projection space version of the image;
    (3) inverse transforming the filtered projection space version of the image back to the original space to obtain a filtered image;

(4) outputting the filtered image to a utilization device, whereby features of said two-dimensional images across said selected set of angles are enhanced in said filtered image.

4. A method of compressing a two-dimensional image across a selected set of angles comprising:
   (1) performing a Radon transform of the image to projection space to obtain a 2D projection space version of the image;
   (2) applying one-dimensional filters that compress the image to the 2D projection space version of the image at a set of selected angles to produce a filtered projection space version of the image;
   (3) inverse transforming the filtered projection space version of the image back to the original space to obtain a compressed image;
   (4) outputting the compressed image to a utilization device.

5. A method as claimed in claim 1, wherein the at least one 1D filter is a bandlimited 1D filter.

6. A method as claimed in claim 5, wherein the bandlimited 1D filter is a 1D Ram-Lak filter.

7. A method as claimed in claim 6, wherein the bandlimited 1D filter is a wavelet filter.

8. A method as claimed in claim 2, wherein the 1D filters are bandlimited 1D filters.

9. A method as claimed in claim 8, wherein the bandlimited 1D filters are 1D Ram-Lak filters.

10. A method as claimed in claim 9, wherein the bandlimited 1D filters are wavelet filters.

11. A method as claimed in claim 3, wherein the 1D filters are bandlimited 1D filters.

12. A method as claimed in claim 11, wherein the bandlimited 1D filters are 1D Ram-Lak filters.

13. A method as claimed in claim 12, wherein the bandlimited 1D filters are wavelet filters.

14. A method as claimed in claim 4, wherein the 1D filters are bandlimited 1D filters.

15. A method as claimed in claim 14, wherein the bandlimited 1D filter are 1D Ram-Lak filter.

16. A method as claimed in claim 15, wherein the bandlimited 1D filter are wavelet filters.

* * * * *